Dec. 4, 1956  O. H. GRAUER  2,772,597
PRECISION REFRACTOMETER
Filed Feb. 6, 1953
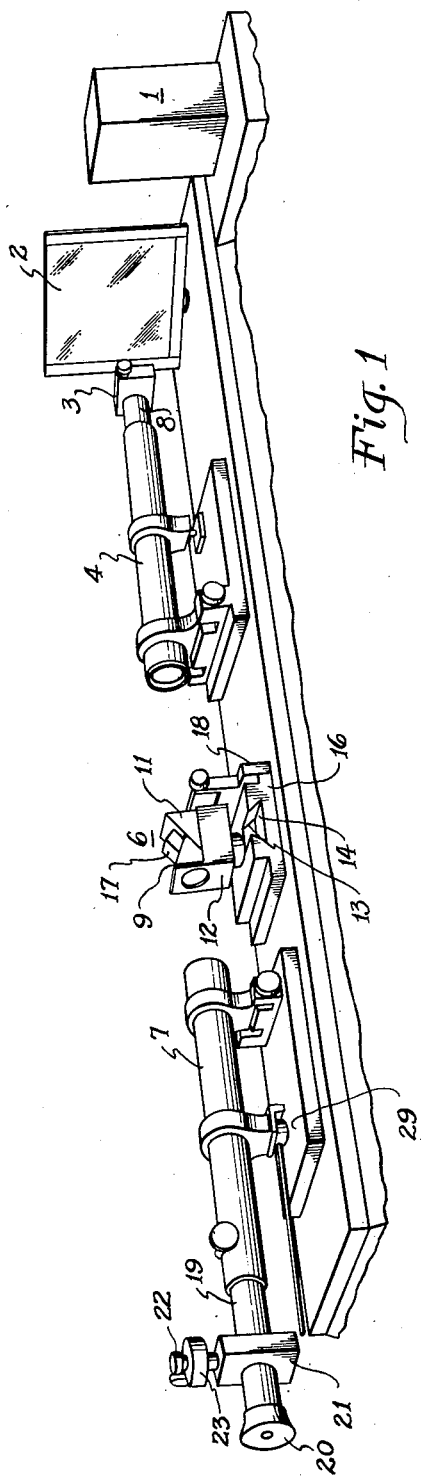
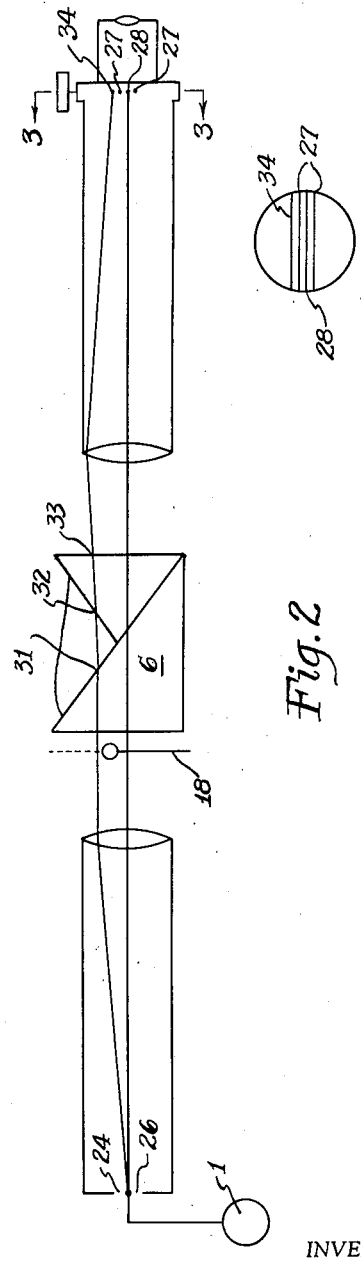
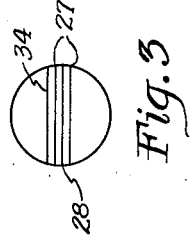
INVENTOR
Oscar H. Grauer
BY Howard L. Rose
AGENT

United States Patent Office 2,772,597
Patented Dec. 4, 1956

2,772,597
PRECISION REFRACTOMETER

Oscar H. Grauer, Kensington, Md., assignor to the United States of America as represented by the Secretary of Commerce Application February 6, 1953, Serial No. 335,611

3 Claims. (Cl. 88—14)

(Granted under Title 35, U. S. Code (1952), sec. 266)

The invention described herein may be manufactured and used by or for the Government of the United States of America for governmental purposes without the payment to me of any royalty thereon in accordance with the provisions of Title 35 U. S. Code (1952), section 266.

The present invention relates to an instrument for measuring the index of refraction of glass and other transparent substances.

In the prior art a number of methods were proposed for the precise determination of the index of refraction of glass and other transparent substances. In most precise commercial refractometers it is necessary to use a precision goniometer as the measuring device. The operation of the goniometer involves a number of precise adjustments and therefore requires trained personnel. Another disadvantage to the use of the goniometer is that it is very expensive and therefore makes the overall equipment expensive. In most of the prior art methods it was essential that the specimen to be tested have ground and polished dihedral faces, and it was necessary to determine precisely the angle between these two faces. Because of this, much time-consuming labor was required in preparing the specimens to be measured. In known types of refractometers a sawed sample can be used, but this method requires the use of a precision goniometer. In most of these prior art methods it is also necessary to make extensive calculations or refer to tables to convert the scale readings to the index of refraction.

It is the primary object of this invention to provide a precision refractometer in which the goniometer is eliminated and a micrometer telescope is used for making the measurements.

Another object of the invention is to provide a precision refractometer in which rough-cut specimens may be used.

Another object of the invention is to provide a precision refractometer in which the deviated and undeviated images appear in the same telescopic field.

Another object of the present invention is to provide a precision refractometer in which a high degree of contrast is provided in the field of view.

Another object of the present invention is to provide a precision refractometer in which measurements made with the instrument are directly related by a constant to the index of refraction.

Another object of the present invention is to provide a precision refractometer in which the index of refraction may be determined rapidly and with a minimum of adjustment of the instrument.

In accordance with the present invention there is provided a light source, a filament, a collimator, two prisms cemented together to form a prism set with a 90-degree hollow, a telescope, and a filar micrometer eyepiece, positioned along a horizontal bed. The specimen to be measured is cut with a 90-degree edge which is fitted into the 90-degree hollow in the prism set, a few drops of an appropriate contact liquid being added. The rays of light from the source enter the collimator and emerge as parallel rays. The filament is located in the focal plane of the collimator. The rays proceeding through the lower half of the prism set form an undeviated image of the filament at the focal plane of the telescope. The rays proceeding through the upper half of the prism set and the specimen are refracted and form another image of the filament at the focal plane of the telescope above or below the undeviated image. The displacement of the two images is a measure of the index of refraction of the sample.

Other uses and advantages of the invention will become apparent upon reference to the specification and drawings.

Figure 1 is a perspective view of the instrument showing the arrangement of the various components.

Figure 2 is a diagrammatic representation of the instrument showing the path of the beams of light through the instrument.

Figure 3 is a cross section taken along line 3—3 of Figure 2, showing the images in the focal plane of the micrometer telescope.

Referring to Figure 1, there is provided a source of monochromatic light 1, which light is directed by the reflector 2 through the filament support 3 into the collimator 4. The rays of light leaving the collimator 4 pass through the prism set 6 into the micrometer telescope 7. The filament support 3, which is supported on the end of a focusing tube 8 of the collimator 4, contains an opening in which is situated a horizontal filament 26, which filament is located in the focal plane of the collimator. The prism set 6 is composed of two prisms 9 and 11, which are positioned in a prism cell 12 in such a manner that the two outer faces along the optical axis of the instrument are approximately perpendicular to the beam of light. The two prisms 9 and 11 are 45°–90° prisms which are cemented together so as to form a 90° hollow. There is an aperture at each end of the prism cell along the optical axis of the the instrument so that the light may pass through the prism set. The prism cell has a trapezoidal base 13, which can be easily slid into or out of the trapezoidal opening 14 in the support 16. This arrangement allows rapid interchange of prism supports containing prism sets of different indices of refraction. The specimen 17, which is rough-cut to a 90° angle, is positioned in the 90° hollow of the prisms 9 and 11 and a few drops of a contact liquid are added so as to form a film between the specimen 17 and the prism set 6. This liquid provides for good optical contact between the specimen and the prism set and allows the passage of light through the interfaces.

Interposed between the collimator 4 and prism set 6 is a diaphragm 18, which is located along the optical axis so that, when it is in the down position as shown, it blocks out the lower half of the beams of light, for reasons to be explained later. The micrometer eyepiece 20 of the telescope may be moved along the optical axis of the instrument by means of the focusing tube 19 so that the bifilar index hairs of the micrometer lie in the common focal plane of the objective and the eyepiece. The vertical height of these bifilar index hairs may be adjusted by the thumb screw 22 which also turns the calibrated drum 23.

Operation of the instrument will be explained with respect to Figure 2. Rays of light from the source 1 are directed through the opening 24 in the filament support 3. The filament 26 is located in the center of this opening and is the object of the optical system. These rays of light from the source are rendered parallel by the collimator. The rays proceeding through the lower half of the prism set forth an undeviated image of the filament 26 at the focal plane of the micrometer telescope. This image appears as a diametral horizontal line through the zero mark of the micrometer scale. That is, when the bifilar index hairs 27 bracket the image 28 of the filament 26 (see Figure 3) the reading on the micrometer scale is zero. This zeroing is accomplished by adjusting the vertical height of the telescope by means of the capstan 29. The rays which pass through the prism set only are undeviated, since the outer faces of the prisms are perpendicular to the path of the beam of light. The rays which traverse the upper half of the prism set 6 and therefore pass through the specimen 17, remain parallel to the lower portion of the beam until they are refracted at the first prism-sample interface 31 (when the index of refraction of the prism set is different from that of the sample). They are refracted again and in the same direction when they strike the sample-prism interface 32, and refracted a third time, also in the same direction at the prism-air interface 33. These refracted beams form another image 34 of the filament 26 in the focal plane of the micrometer eyepiece either above or below the zero line 28, depending upon whether the sample has a higher or lower index of refraction than the prism set. The micrometer drum is then rotated until the refracted image 34 is centered between the bifilar index hairs 27, and the scale 23 is then read. The scale reading is a measure of the index of refraction. If the index of refraction of the prism set and that of the specimen are the same, the rays will be undeviated and the images will be superposed.

The prism set serves several important functions in this invention. If the two faces of the prism set are not exactly parallel, which is often the case, the light will necessarily be refracted at one of the air-prism interfaces, since both faces cannot be perpendicular to the light. This will not affect the results, however, since both portions of the beam (that passing through the prism set and that passing through the set and specimen) will be refracted the same amount at that interface, thus automatically eliminating error from this cause. Similarly, deviation may occur when the prism-set faces, although parallel, are not exactly perpendicular to the beam of light. In this case the beam of light will be refracted at both air-prism interfaces, but since both portions of the beam will be refracted the same amount, the results will not be affected. If one is willing to accept the errors introduced by this lack of parallelism or perpendicularity, the portion of the prism set below the specimen may be eliminated and the lower portion of the beam need not pass through the prism set but can be transmitted through the air. If this course is followed, the specimen can be supported in the manner shown. The only change will be in the elimination of the portion of the prisms below the bottom of the specimen.

The range of each prism set is about 2 in the second decimal place. That is, although this instrument can measure the index of refraction of a specimen to within one digit in the fifth decimal place, the index of refraction of the prism set need correspond to the index of refraction of the specimen to within only two digits in the second decimal place. As pointed out with reference to Figure 1, the prism holders—each holder having its own set of prisms—can be quickly interchanged if it is found that the difference between the index of refraction of the prism set and that of the specimen is too great. Also, the contact liquid need not match the index of refraction of the specimen but can vary as much as 3 digits in the third decimal place. If it is found that the deviation is too great, the prism holder 12 may be removed and the specimen and prism washed and an appropriate liquid added. This operation is also very simple and rapid.

As ordinarily observed, the refracted image 34 may have low contrast because of the flood of light through the lower half of the prism. The contrast of the refracted image can be controlled by the use of the diaphragm 18. By positioning the diaphragm so that it intercepts the lower half of the beam, the contrast of the refracted image can be increased with respect to that of the field of light; by placing the diaphragm so as to intercept the upper half of the beam the contrast of the undeviated image 28 can be increased.

The invention, as thus far described, uses a filament 26 at the focal plane of the collimator. However, it is equally possible to use an illuminated slit or a combination of an illuminated slit and a filament.

As can be seen from the above description, very few adjustments need be made. Initially it may be necessary to adjust the telescope so that the undeviated image lies along the zero line of the micrometer scale and then subsequently it will be necessary to operate the micrometer until the index hairs bracket the refracted image 34. Other than this, and the possibility that the prism set or contact liquid may have to be changed, no adjustments are necessary.

The readings taken from the micrometer scale 23 are directly related to the index of refraction by a constant, and there is no need for complicated calculations or for reference to extensive tables.

It will be apparent that the embodiments shown are only exemplary and that various modifications can be made in construction and arrangement within the scope of my invention as defined in the appended claims.

I claim:

1. A precision refractometer for measuring the index of refraction of a specimen to an accuracy within one digit in the fifth decimal place, comprising a monochromatic source of light, a collimator located in the path of the beam of light from said source to render the rays of said beam parallel, an image producing filament located at the focal plane of said collimator, a prism set having an opening for holding said specimen positioned in the path of said parallel rays of light, the faces of said prism set being only approximately parallel and approximately perpendicular to the beam of light, said prism set having an index of refraction which corresponds to the index of refraction of the specimen to within two digits in the second decimal place, a contact liquid forming a film between said prism set and said specimen, said contact liquid having an index of refraction which corresponds to the index of refraction of said specimen to within 3 digits in the third decimal place, a micrometer telescope having filar index means defining a fiducial reference datum in the focal place of said telescope positioned in the path of said light beam, a first portion of said light beam passing substantially undeviated through the body of said prism set only, a second portion of said light beam passing through said prism set and said specimen whereby each of said beam portions projects an undeviated and deviated optical image of said filament respectively on the focal plane of said telescope adjacent said filar index means, and means for measuring the deviation between said undeviated and deviated images with respect to said filar means.

2. The invention of claim 1 in which the means for measuring the deviation between said images comprises micrometer means on said telescope for positioning said filar means with respect to each of said images.

3. The invention of claim 2 including a movable diaphragm positioned on the optical axis of the beam of light and means for selectively interposing said diaphragm to block out said undeviated beam portion.

References Cited in the file of this patent

UNITED STATES PATENTS

| 454,989 | Soden | June 30, 1891 |
| 2,401,381 | Willard | June 4, 1946 |

FOREIGN PATENTS

| 5,281 | Great Britain | of 1892 |

OTHER REFERENCES

Hughes, J. V.: "A New Precision Refractometer," Journal of Scientific Instruments, vol. 18, December 1941, pages 234–237.

Holmes, J. G.: "A Direct Reading Refractometer," Journal of Scientific Instruments, vol. 22, November 1945, pages 219–221.